(12) United States Patent
Smith (10) Patent No.: US 6,923,357 B2
(45) Date of Patent: Aug. 2, 2005

(54) FISHING GEAR HOLDER

(76) Inventor: James M. Smith, 559 Logan Pl., Newport News, VA (US) 23601

( * ) Notice: Subject to any disclaimer, the term of this patent is extended or adjusted under 35 U.S.C. 154(b) by 121 days.

(21) Appl. No.: 10/386,510

(22) Filed: Mar. 13, 2003

(65) Prior Publication Data

US 2003/0173390 A1 Sep. 18, 2003

Related U.S. Application Data

(60) Provisional application No. 60/363,536, filed on Mar. 13, 2002.

(51) Int. Cl.[7] ............................................. A45C 13/30
(52) U.S. Cl. ....................... 224/605; 224/637; 224/638; 224/647; 224/649; 224/251; 224/901.4; 224/920; 224/922; 43/21.2
(58) Field of Search ................................ 224/637, 638, 224/639, 647, 648, 649, 251, 901.4, 901.8, 920, 921, 922, 604, 605; 43/21.2

(56) References Cited

U.S. PATENT DOCUMENTS

| | | | | |
|---|---|---|---|---|
| 860,395 A | * | 7/1907 | Lindsey | ....................... 224/649 |
| 1,198,202 A | | 9/1916 | Drinkard | |
| 1,290,827 A | * | 1/1919 | Yergason | .................... 224/623 |
| 2,538,677 A | * | 1/1951 | Ferrand | ............................ 2/48 |
| 3,282,482 A | * | 11/1966 | Scharsu | ....................... 224/605 |
| 4,106,121 A | * | 8/1978 | Belson | ........................... 2/102 |
| 5,247,707 A | * | 9/1993 | Parker et al. | ................... 2/102 |
| 5,526,535 A | | 6/1996 | Dobrzenski | |
| 5,619,819 A | | 4/1997 | Hauschild | |
| 5,630,536 A | * | 5/1997 | Bugnaski | ..................... 224/600 |
| 5,639,005 A | * | 6/1997 | Chouinard | .................. 224/580 |
| 5,797,212 A | | 8/1998 | Kistner et al. | |
| 5,975,393 A | | 11/1999 | Bellamy | |
| 6,065,658 A | * | 5/2000 | Hashimoto | ................... 224/647 |
| 6,267,276 B1 | * | 7/2001 | Cook | .......................... 224/183 |
| 6,568,575 B1 | * | 5/2003 | Bartholomew | .............. 224/583 |

* cited by examiner

Primary Examiner—Stephen K. Cronin
(74) Attorney, Agent, or Firm—Richard C. Litman (57) ABSTRACT

A harness-like fishing gear holder vest upon which various pouches are mounted for storing fishing supplies and caught fish. The harness includes two shoulder straps on which are attached six pockets, three on the front of each straps. The two straps are attached to a waist belt, which has two additional pouches attached to the sides. A chest strap is provided between the two shoulder straps. Two adjustable rod-holding rings for holding a fishing rod are attached to the straps. This enables the user's hands to be free for performing various other activities. A detachable line cutter and a snap hook are placed on the waist belt by looped snap bands. Pouches are attached to the shoulder straps by clamp-like clips. The device is fully adjustable, fastened with VELCRO belt and shoulder adjustment. The vest is worn by an angler while wading in water up to his chest.

19 Claims, 14 Drawing Sheets

Fig. 7

FISHING GEAR HOLDER

CROSS-REFERENCE TO RELATED APPLICATION

This application claims the benefit of U.S. Provisional Patent Application Ser. No. 60/363,536, filed Mar. 13, 2002.

BACKGROUND OF THE INVENTION

1. Field of the Invention

The present invention relates generally to fishing apparel. More particularly, the present invention relates to a harness worn by a fisherman upon which is mounted pouches for supplies, a line cutter, a snap hook for a net or fish stringers, and rings for holding a fishing rod.

2. Description of Related Art

The use by fishermen of vests or waders with pockets for holding fishing gear, quarry, or bait are well known. Waders are limited to practical use in water up to near the waist. Present vests are not designed for submersion during fishing. It is also impractical to wade into water far from shore due to the need to return for rigging changes. It is difficult to hold the fishing rod while standing in the water when rigging or landing and netting fish require two hands. It would be desirable to provide a fishing vest which may be substantially submerged while retaining various tackle, bait, and caught fish in pouches, and providing for high mounted pouches for holding items that must remain dry, and providing a device for holding the fishing rod while the fisherman uses both hands to rig tackle, allowing the fisherman to wade into and remain in water up to his chest. It would also be desirable to provide such a vest that is easily adjusted to the size of the wearer and is flexible in the number and position of pockets provided.

U.S. Pat. No. 1,198,202, issued Sep. 12, 1916, to Drinkard, describes a harness-like fishing device having two shoulder straps, a body strap that wraps around the chest, and a belt. The belt has receptacles for carrying lunch, tackle, etc. A holder is provided for holding a fishing rod.

U.S. Pat. No. 5,975,393, issued Nov. 2, 1999, to Bellamy, describes a fishing rod carrying backpack having a rod-holding member in the bottom of the backpack. Bellamy employs snap-together buckles for fastening the backpack around the wearer.

U.S. Pat. No. 5,526,535, issued Jun. 18, 1996, to Dobrzenski, describes a fishing vest with hinged pockets, three pockets attached to each of the two front panels. A pocket is also placed on the back of the vest.

U.S. Pat. No. 5,619,819, issued Apr. 15, 1997, to Hauschild, describes a carrying case that may be wrapped around a fisherman's waist for carrying tackle, etc. It is adjustably held around the waist by hook and loop material such as VELCRO.

U.S. Pat. No. 5,797,232, issued Aug. 25, 1998, to Kistner et al., describes a fishing gear and rod holder that is attachable to the chest strap of a wader or the bib of bib overhauls.

None of the above inventions and patents, taken either singly or in combination, is seen to describe the instant invention as claimed.

SUMMARY OF THE INVENTION

The present invention is a harness-like vest upon which individual pockets and pouches are mounted for storing fishing supplies and caught fish. There is also provided a line cutter and rings for holding a fishing rod. The harness includes two shoulder straps on which are attached six pockets, three on the front of each strap. The two straps are attached to a waist belt, which has two additional pouches attached to the sides. The side pouches and four lower strap pouches (below the chest) have drain holes to allow trapped water to drain. The two upper strap pockets remain dry.

The belt is fastened around the user's body by means of a fast snapping buckle. A chest strap is provided between the two shoulder straps to help secure the shoulder straps to the user, avoiding one of them from slipping off a shoulder. Two adjustable rings are attached to the straps on the back of the vest-like device, one attached to each strap. The two rings are used to hold a fishing rod. In this way, the user's hands are free for performing various other activities. A detachable line cutter is placed on the waist belt. The device is fully adjustable and easy to fasten with VELCRO belt and shoulder adjustment and for pocket, pouch, and line cutter attachment. The inventive harness-like vest makes it practical for the fisherman to wade farther out into the water up to his chest and provides for holding the rod to prepare tackle, avoiding a trip to shore for this task.

Accordingly, it is a principal object of the invention to provide a harness-like fishing gear holder vest having shoulder straps attached to a waist belt and useable having by a fisherman wading in deep water.

It is another object of the invention to provide a holder as above which is submergible up to the angler's chest.

It is a further object of the invention to provide a holder as above having a variety of pouches and pockets for gear and bait mounted on the shoulder straps and waist belt.

Still another object of the invention is to provide a holder as above having supporting rings on shoulder straps for holding a fishing rod, freeing the user to use both hands for rigging tackle, etc.

Yet another object of the invention is to provide a holder as above having a line cutter mounted on the belt.

Still another object of the invention is to provide a holder as above having the shoulder straps and waist belt easily adjustable to the angler's size and to have an adjustable chest belt extending between the shoulder belts.

Yet another object of the invention is to provide a holder as above employing VELCRO hook and loop material where useful to allow easy attachment and removal of the pouches, pockets, line cutter, chest belt, and other accessories.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

The present invention is a harness-like vest upon which individual pockets and pouches are mounted for storing fishing supplies and caught fish. There is also provided a line cutter and rings for holding a fishing rod.

Referring to the Figures, there are shown various views of the harness-like fishing gear holder vest of the present invention. Harness-like vest 10 comprises harness 12 having waist belt 14 secured by buckle 16 on angler A. Harness 12 further comprises left shoulder strap 18 and right shoulder strap 20 adjustably attached to waist belt 14 and secured together by chest strap 17. Chest strap 17 is adjustably mounted along left shoulder strap 18 by left chest strap buckle 19, and chest strap 17 is mounted along right shoulder strap 20 by right chest strap buckle 21 by means of opposing chest strap adjustment rings 22. This allows chest strap 17 to be adjusted upward or downward to fit the angler A. Chest strap adjustment rings 22 are mounted on inner facing rotatable portions of buckles 19 and 21 for adjustable attachment of chest strap 17 therebetween. Chest strap 17 is fixed to left chest strap buckle 19 by wrapping around its respective adjustment ring 22 and securing fixed end 23 by to itself by sewing or other means. Chest strap 17 is threaded through right chest strap buckle adjustment ring 22 and extends over itself for adjustable attachment, thus allowing the securing of chest strap 17 at a desired space between buckles 19 and 21 for easy donning, fitting, and removal of the harness 12 by a particular angler A. Adjustable belt fitting is preferably accomplished by means of mating hook and loop material 24 and 25, respectively, each so disposed that the free end of strap 17 may be adjusted to the left or right and hook material 24 may be secured to loop material 24 to form a temporary bond sufficient in strength to maintain chest strap secure at the desired buckle separation length while worn by the angler A. (Throughout this document hook and loop materials refer to commercial VELCRO material.)

Figure 1:
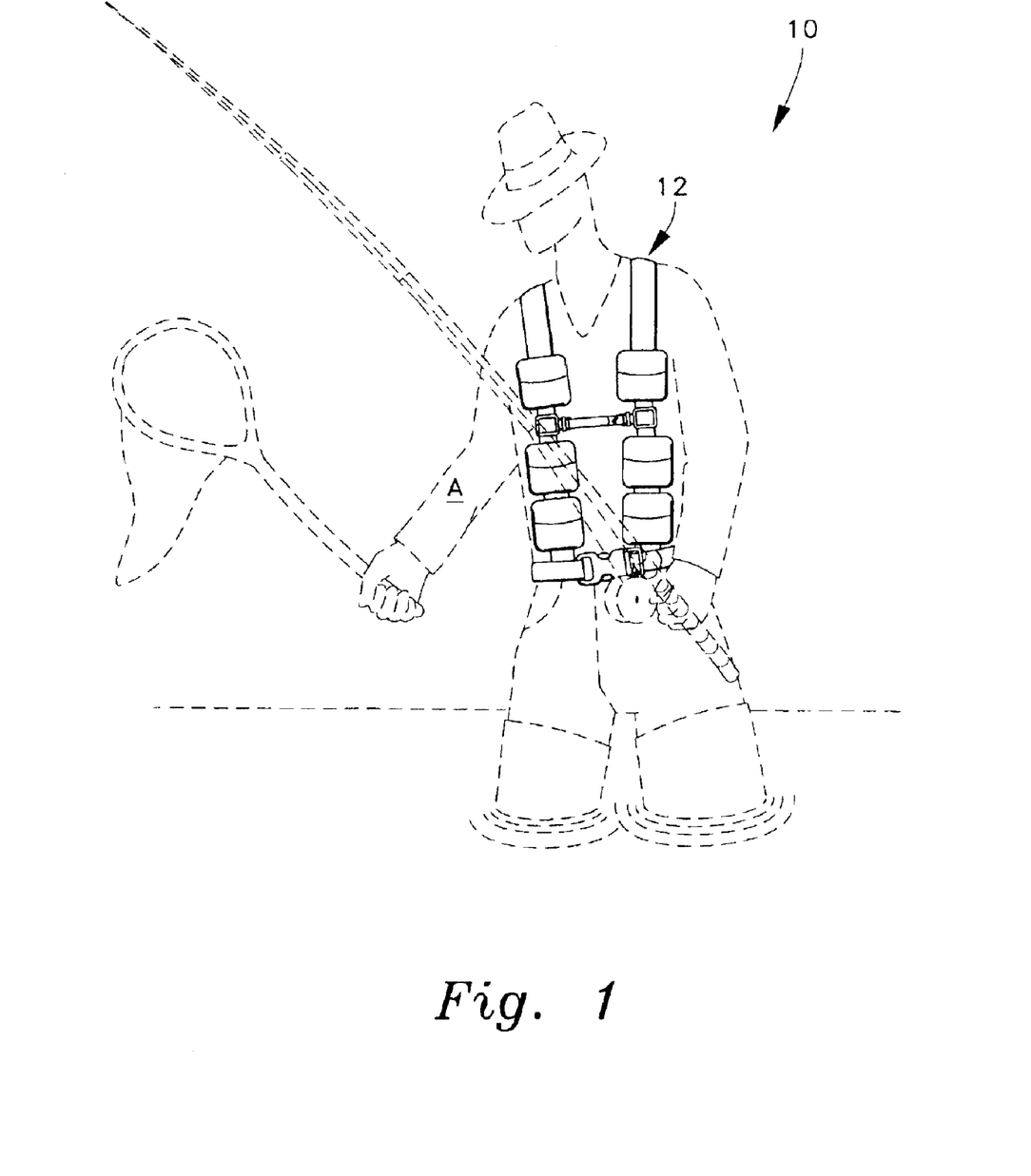
FIG. 1 is an environmental, perspective view of a harness-like fishing gear holder vest according to the present invention.
Figure 2:
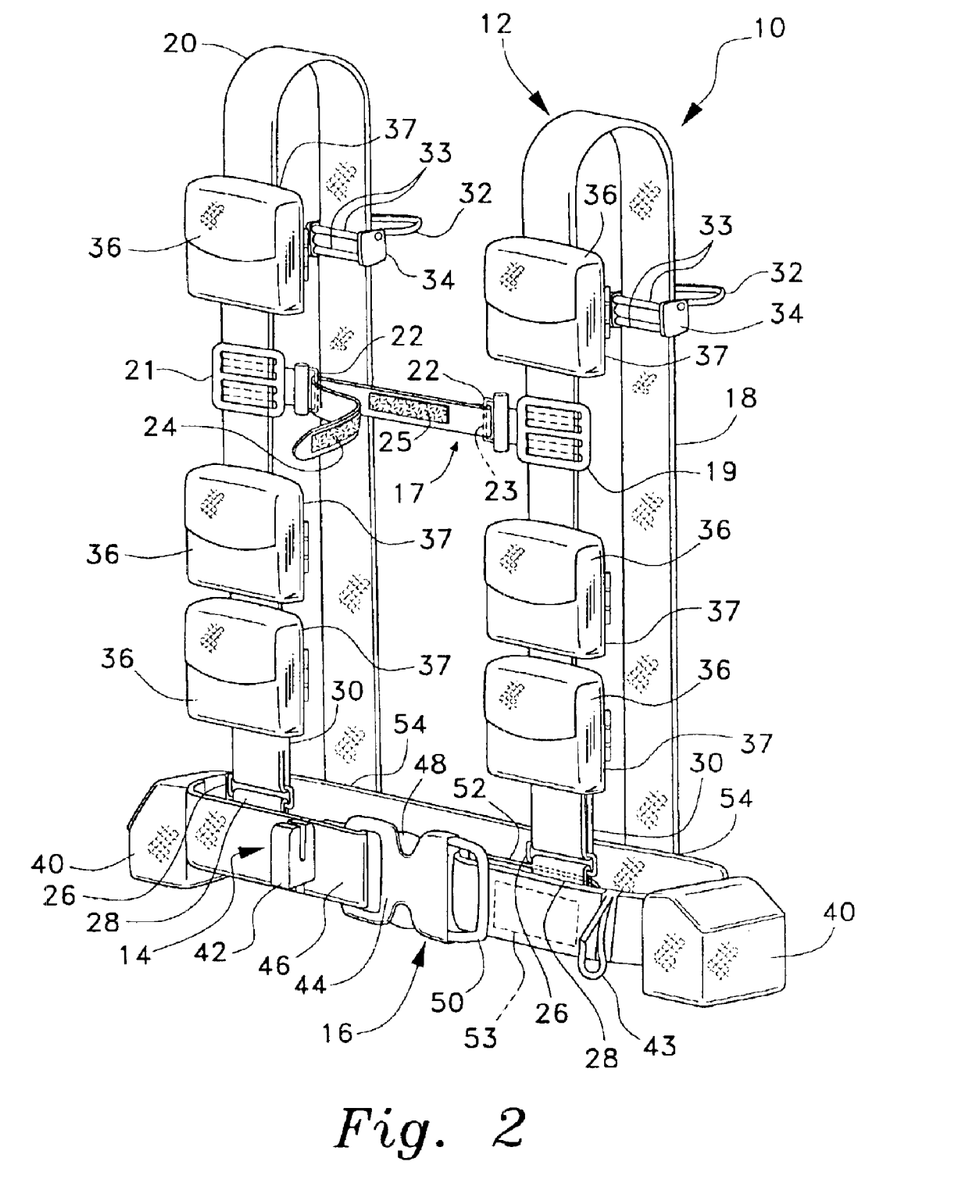
FIG. 2 is a perspective view of the vest of FIG. 1.
Figure 3A:
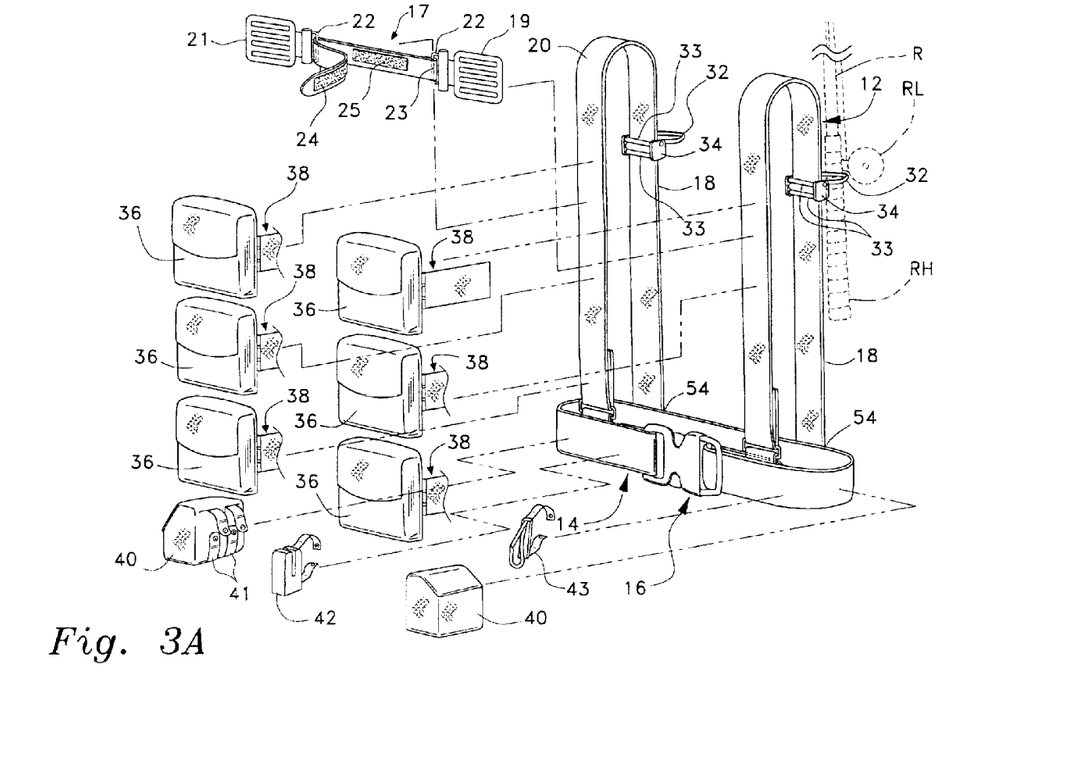
FIG. 3A is an exploded view of the vest of FIG. 1 showing a fishing rod is held in the holding ring.

Referring more particularly to FIGS. 2 and 3A, there are shown a perspective view and an exploded view, of the inventive fishing harness and gear holder 10, shoulder straps 18 and 20 are adjustably attached to waist belt 14 by means of strap adjustment rings 26 attached to the respective left and right front portions of waist belt 14 by strap adjustment ring belt anchors 28 sewn (not shown) to the inner side of belt 14. Straps 18 and 20 have strap adjustment folds 30 at their respective free ends and have a mating hook material 80 and loop material 82 (see detail FIG. 4C) on an mating inner sides for strap length adjustment relative to belt 14 in a similar manner to the length adjustment of chest strap 17 (described above). Hook material 80 removably attaches to loop material 82, allowing straps 18 and 20 to be adjusted in relative length by detaching hook material patch 80 from loop material 82, adjusting to the desired length, and reattaching hook material 80 to loop material 82 at a desired point. Each strap is preferably adjusted to the same length to allow waist belt 14 to be horizontally suspended relative to the angler A.

Figure 5A:
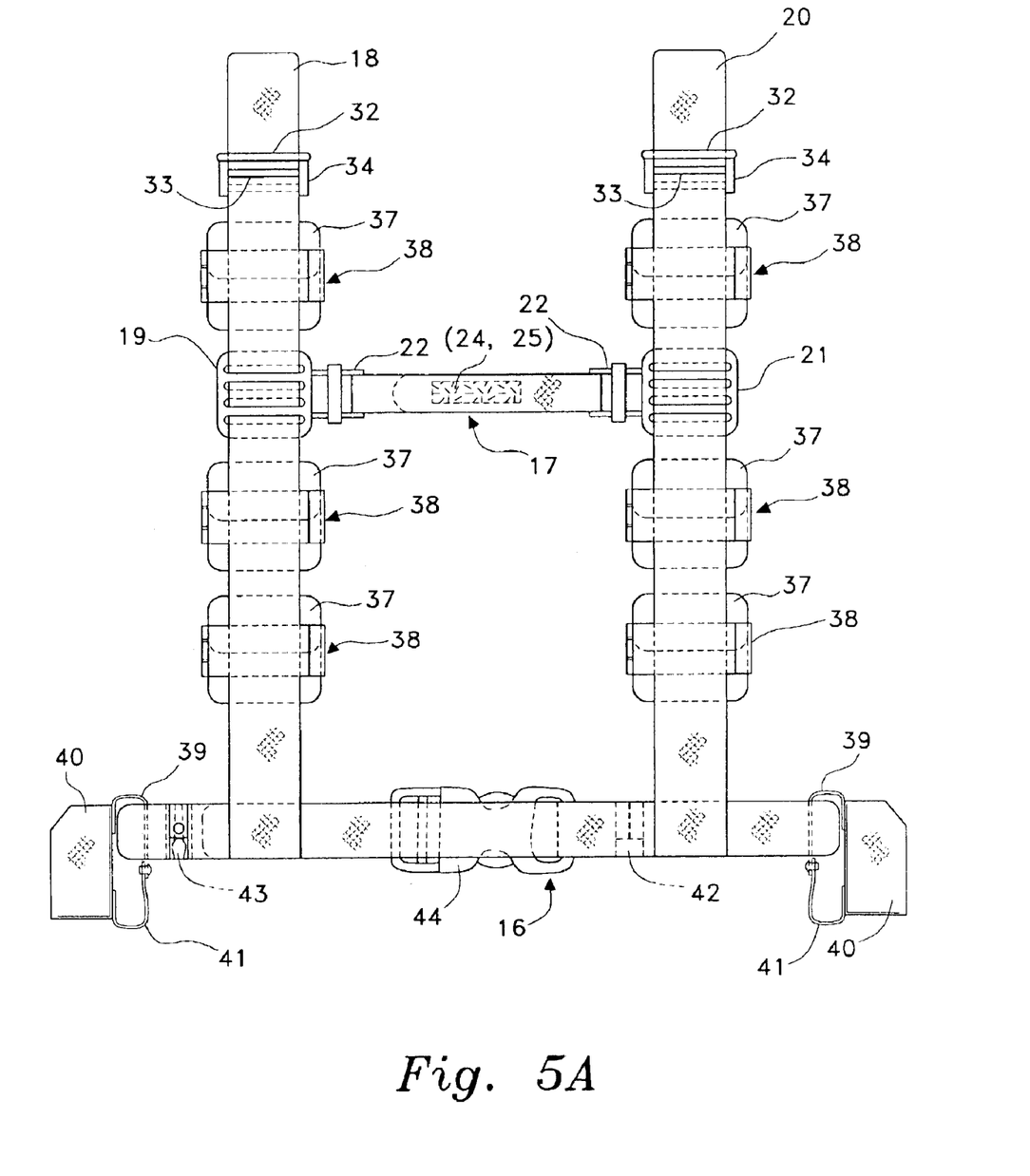
FIG. 5A is a diagrammatic rear elevation view of the fishing vest of FIG. 2.
Figure 5B:
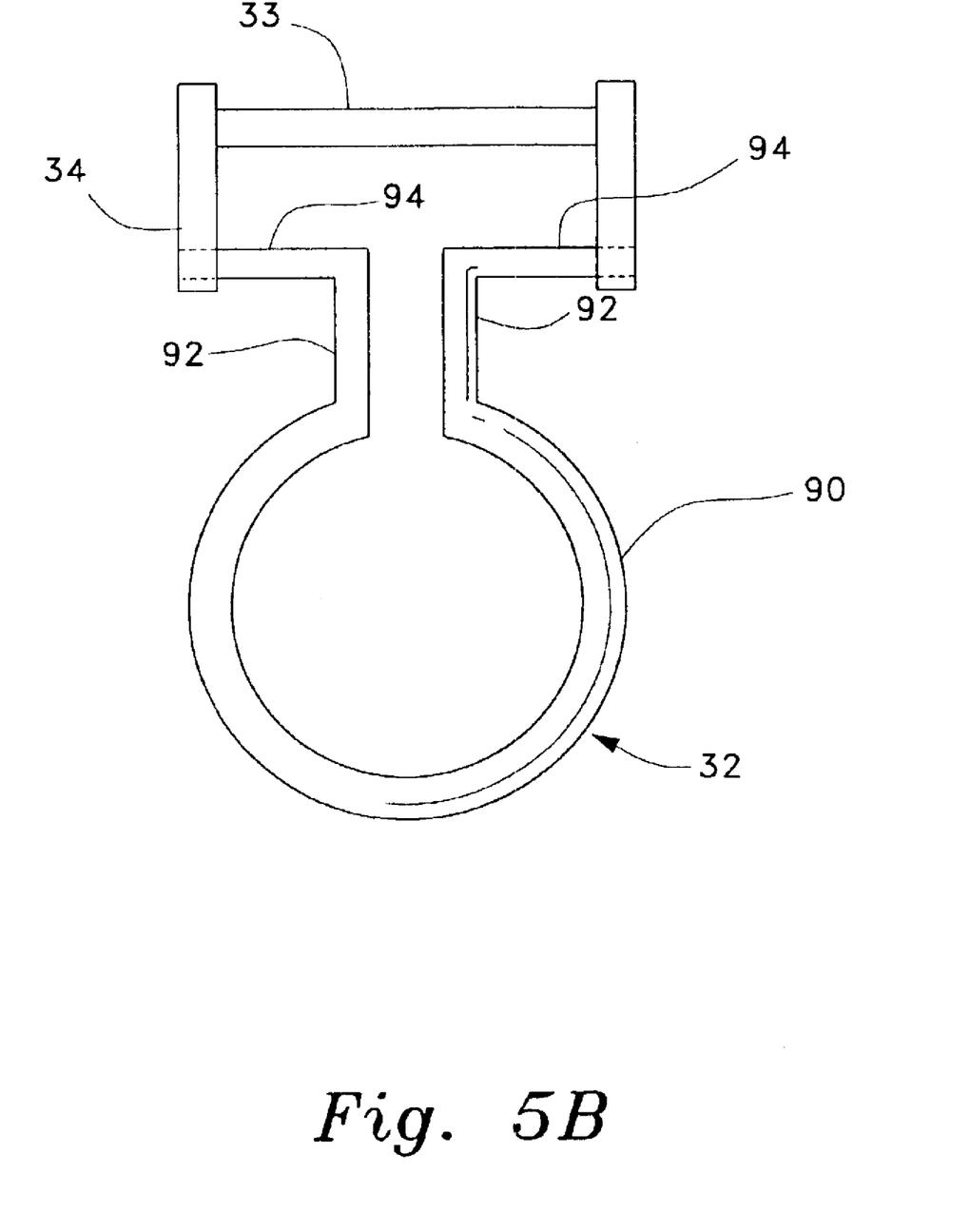
FIG. 5B is a detail view of the ring fishing rod holder and triple bar ring strap mounting of FIG. 5A.

Referring more particularly to FIGS. 2, 5A, and 5B, there are shown a perspective view and a diagrammatic rear elevation view of the fishing harness and gear holder 10 and a plan view of the triple bar ring strap mounting 34 and attached rod holding ring 32, respectively. Rod-holding rings 32 are mounted behind the shoulders of the wearer on shoulder straps 18 and 20, respectively, and adjustably held in place by triple bar strap mountings 34 having three vertically aligned cross bars 33 through which the straps are threaded. A fishing rod handle RH of rod R may be fitted through ring 32 up to the reel RL when the angler A needs to use both hands to accomplish a task such as changing rigging. As seen in FIG. 5B, rod holding ring 32 comprises ring portion 90 leading to shank portion 92, which, in turn, leads to clip portions 94 which are fixedly mounted in the upper rear portion opposing end plates of triple bar ring strap mounting 34. Three vertically aligned crossbars 33 are attached between the front portions of the opposing end plates of mounting 34. Holding ring 33 extends outwardly and perpendicular to its respective shoulder strap 18 or 20 when worn by angler A so as to easily receive rod handle RH.

Flapped pouches 36 have clips 38 attached to their back face 37 (see FIG. 6C) that allow removable attachment to straps 18 and 20 by snapping over the strap. Flapped pockets 38 may be mounted above the chest strap 17 and are thus kept above the water level, being intended to hold articles and food that should be kept dry. Flapped pockets 38 are similarly mounted on straps 18 and 20 at points below chest strap 17 and may be subject to submersion in water and, if so, may have drain holes (not shown) at their respective lower ends to allow drainage of water upon emerging from the water. These lower mounted flapped pockets 38 carry tackle and items not subject to water damage and may vary in number, four being illustrated in the present embodiment. Side pouches 40 are similar in construction to pockets 38 but are larger and deeper and are located on waist belt 14, preferably at opposing hip areas, removably attached by means of looping over and engaging upper snap retaining straps 39 and lower snap retaining straps 41 on the pouch back wall 66 (see FIG. 3C). Side pouches 40 may be used for tackle, bait, or quarry and have drain holes 69 at their respective lower ends as in the lower pouches 38.

Waist belt 14 has a belt buckle outer housing 44 at a fixed end of belt buckle outer housing loop 46, and an adjustable belt buckle inner snap portion 48 having adjustment portion 50 through which the free end of belt 14 is threaded forming belt adjustment flap 52. This type of buckle is conventional in outdoor sports equipment as shown more completely in U.S. Pat. No. 5,975,393 to Bellamy discussed above, the disclosure of which is hereby incorporated by reference. Belt adjustment flap 52 folds over inside belt 14 and is removably attached by hook and loop material 53 (shown in hidden lines) and the length of belt 14 between buckle outer housing 44 and adjustment portion 50 is adjusted in a manner similar to that of chest strap 17 described above.

Figure 3B:
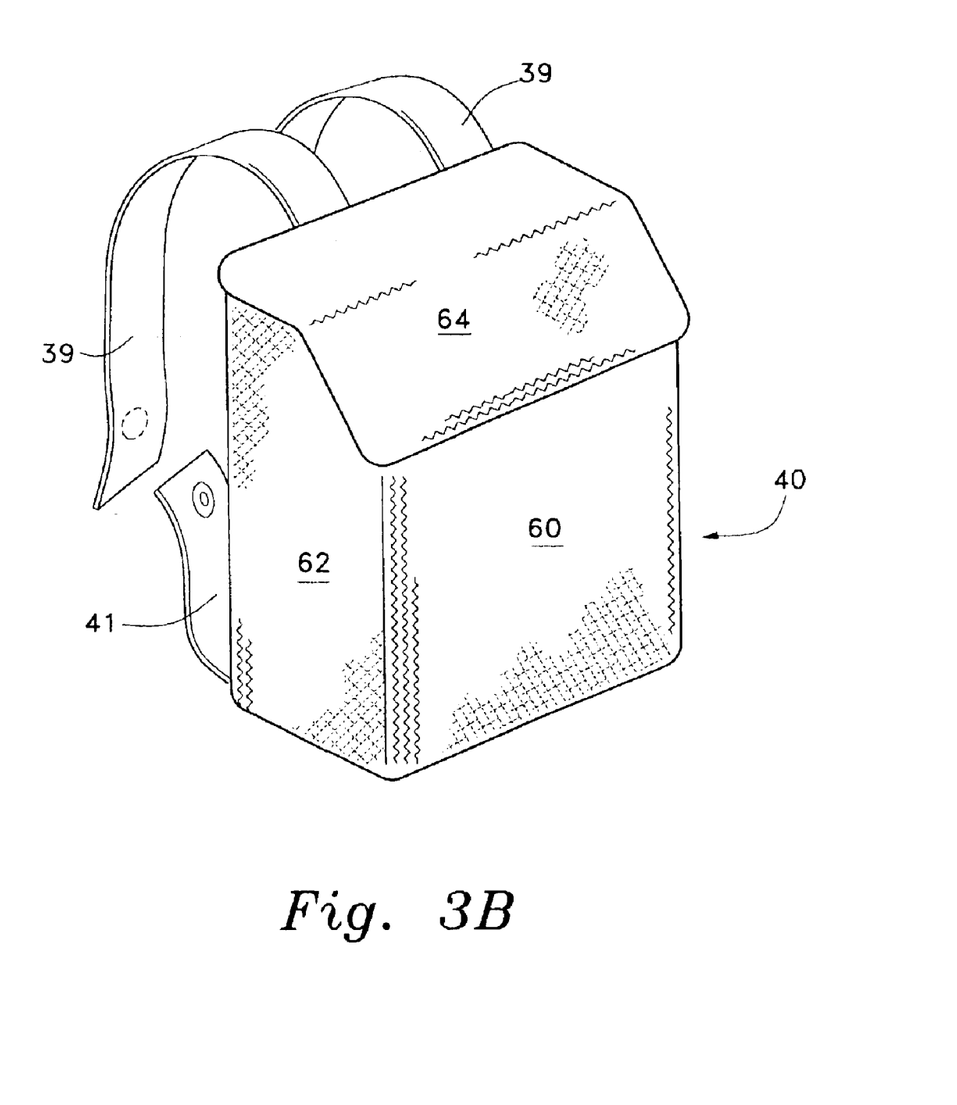
FIG. 3B is a perspective view of the side pouch of FIG. 2.
Figure 3C:
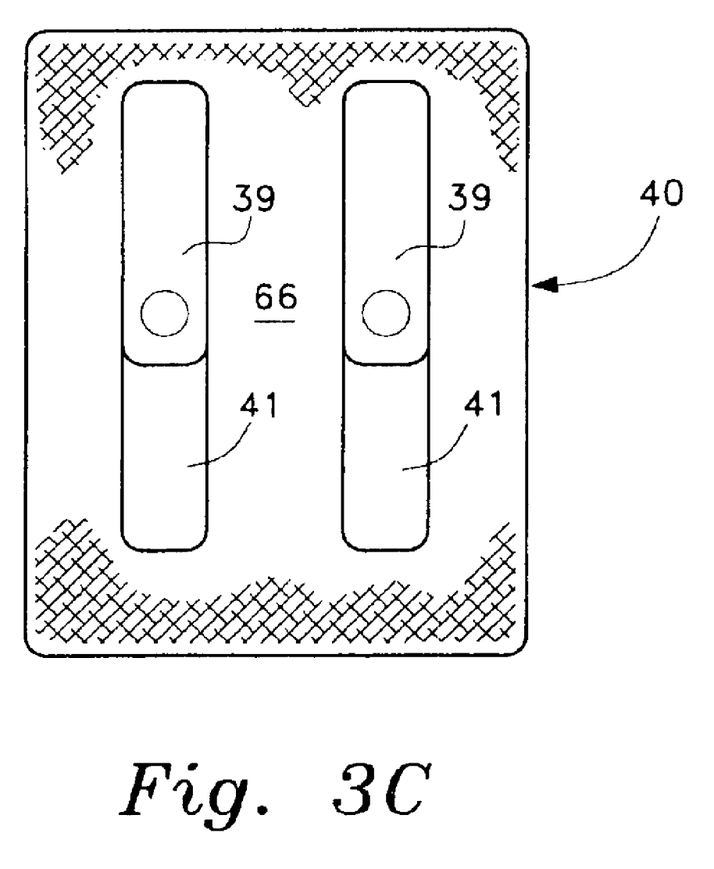
FIG. 3C is a back elevation view of the side pouch of FIG. 2.
Figure 3D:
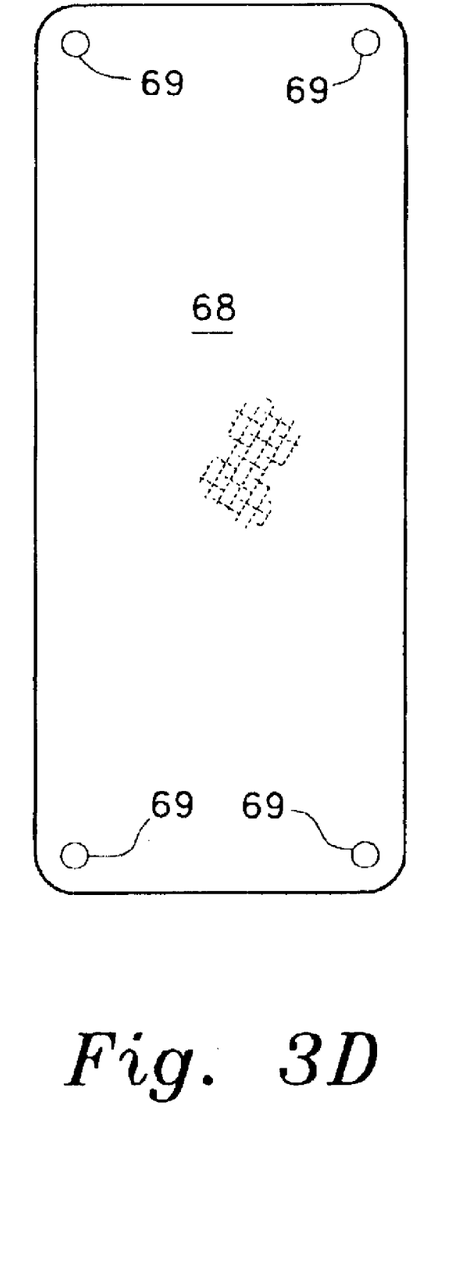
FIG. 3D is a bottom view of the side pouch of FIG. 2.

Referring more particularly to FIGS. 3B–3D there is shown a perspective view, a rear elevation view, and a bottom view, respectively, of a side pouch 40. Side pouch 40 has a front wall 60, sidewalls 62, a pouch cover 64, a back wall 66, and a bottom wall 68. Upper snap retaining straps 39 extend outward from the upper portion of back wall 66, and lower snap retaining straps 41 extend outward from the lower portion of back wall 66. As explained above, upper straps 39 are looped over belt 14 and lower straps 41 looped under belt 14 and snapped together to attach side pouch 40 to belt 14. Cover 64 may be held in a closed position by gravity, spring force, hook and loop material or any-other appropriate means, such not being a part of the present invention. The covers on pouches 36 may be closed in a similar manner.

Figure 4A:
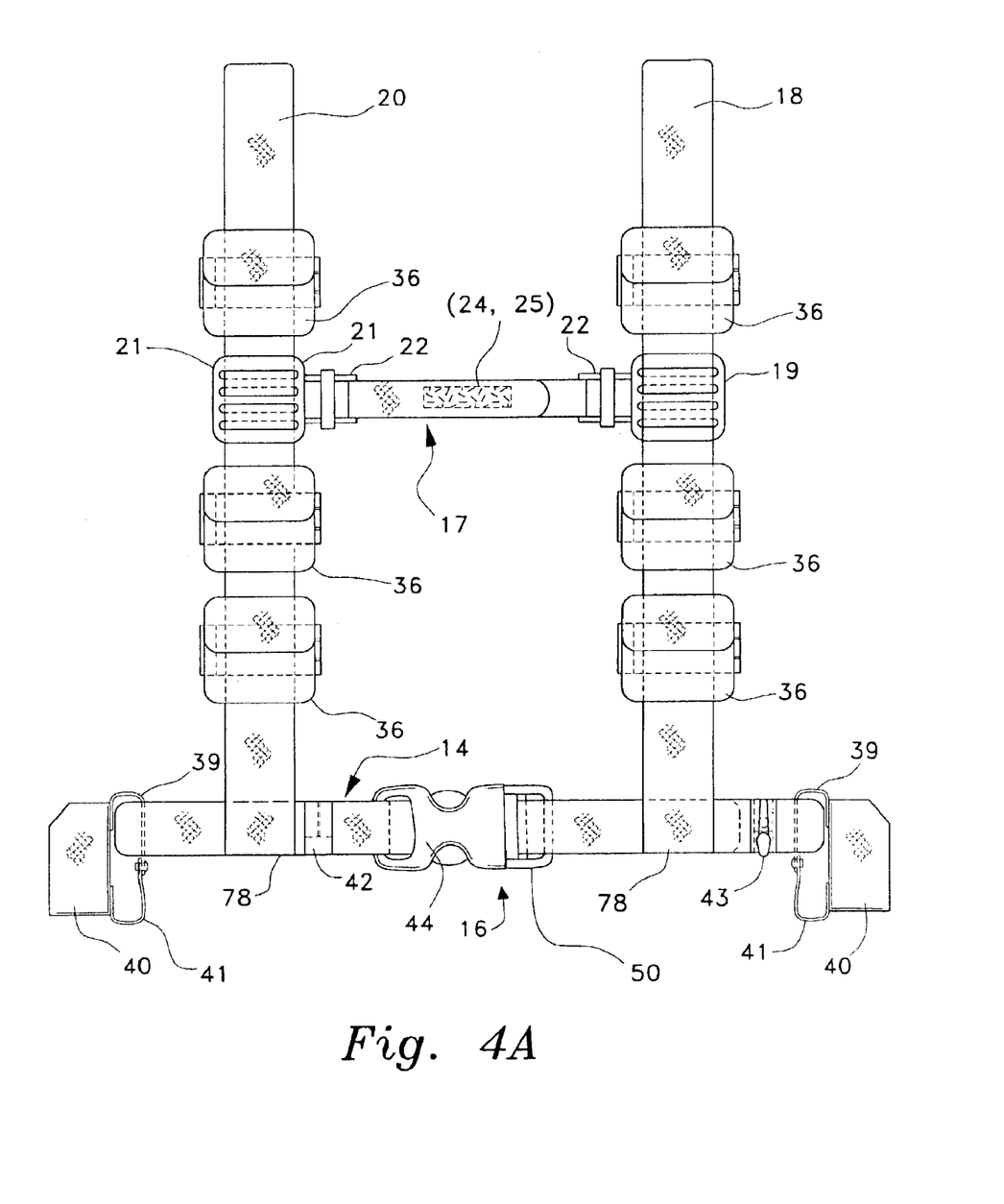
FIG. 4A is a diagrammatic front elevation view of the fishing vest of FIG. 2.

Referring to FIG. 4A there is shown a front elevation view of a fishing harness and gear holder similar to that of FIG. 2. In this embodiment, left shoulder strap 18 and right shoulder strap 20 are not adjustable in length, being fixed to the front portion of belt 14 by sewing (not shown) at connections 78, respectively. Chest strap 17 is shown with the free end in the secured position, hook and loop material 24 and 25 (shown in hidden lines) maintaining the chest strap in the secured position during use.

Figure 4B:
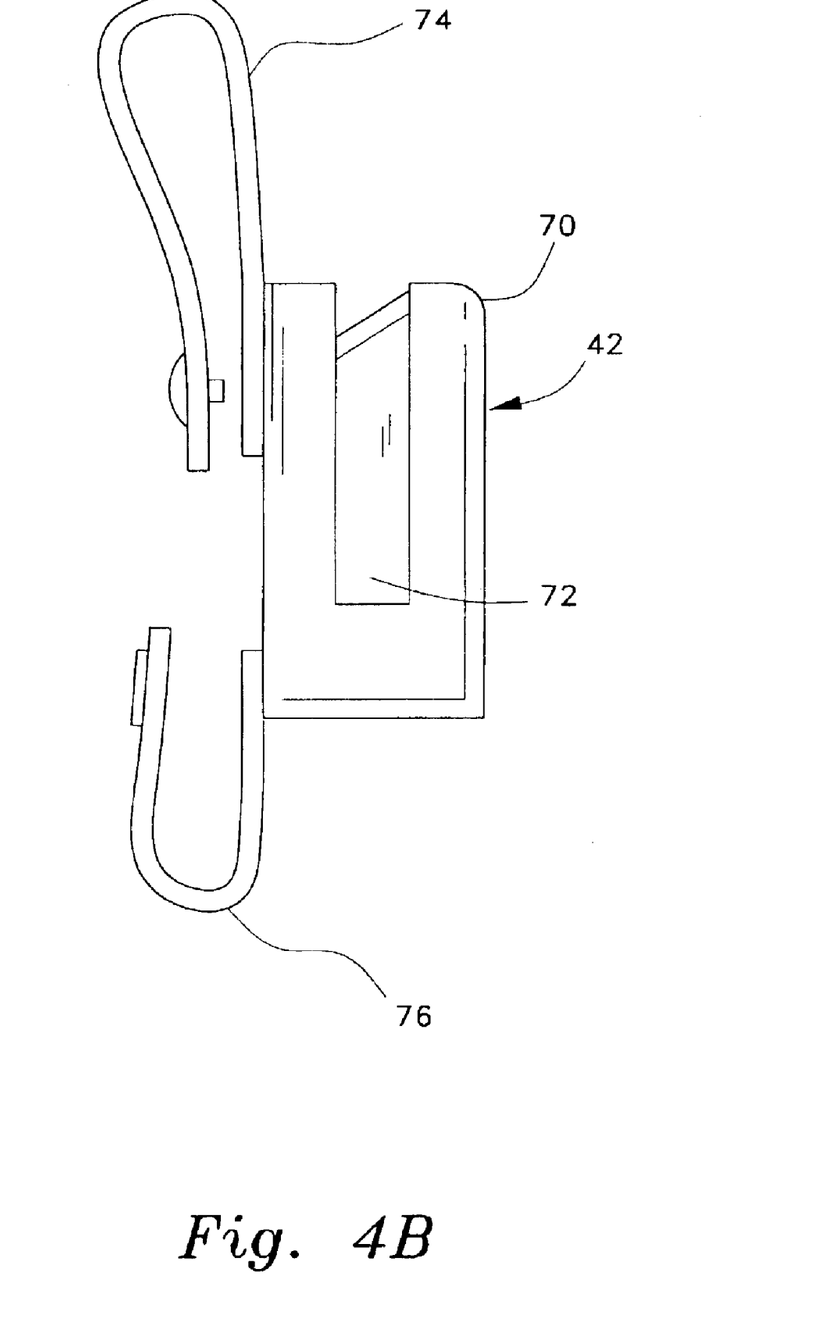
FIG. 4B is a detail view of the line cutter feature of FIG. 2.
Figure 4C:
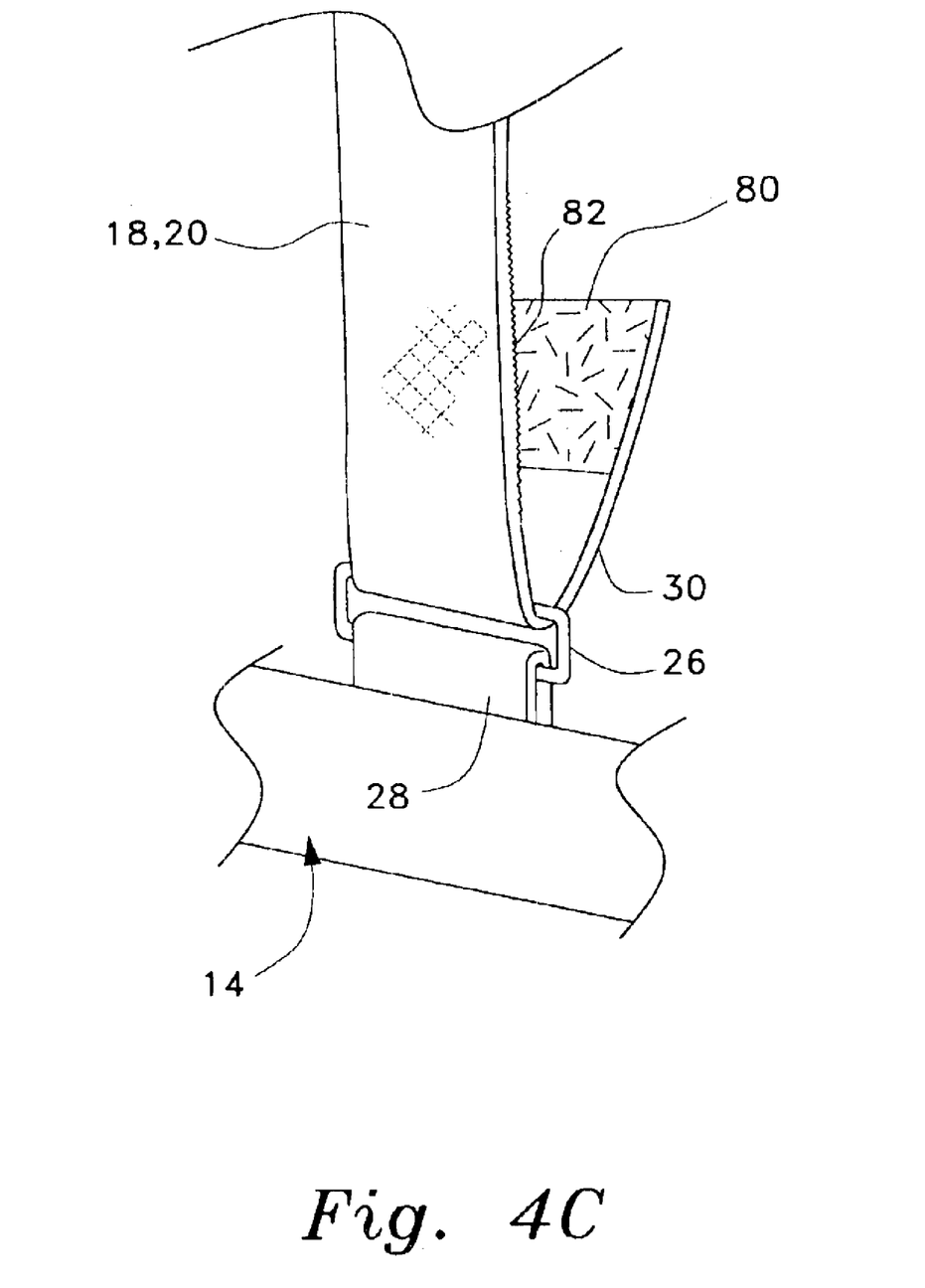
FIG. 4C is a detail view of the adjustable shoulder strap to belt connection of FIG. 2.

Referring to FIG. 4B, there is shown a side elevation view of line cutter 42, wherein generally rectangular body 70 has a centrally located slit oriented parallel with belt 14 when mounted thereon. A top-edged blade 72 is perpendicularly located in the central part of body 70 and bridging the slit so as to be protected by body 70 and avoid accidental injury to the angler A. The blade is preferably sloped downward from front to rear of body 70 to aid in cutting fishing line. Line cutter 42 has a rectangular body back having an upper snap retaining strap 74 extending from its upper back portion and a lower snap retaining strap 76 extending from its lower back portion. Upper strap 74 is looped over belt 14 and lower strap 76 looped under belt 14 and snapped together to attach line cutter 42 to belt 14, preferably near belt buckle outer housing 44. Line cutter housing 70 is oriented so as to allow access to blade 72 from the top for ease of use by the angler A while providing protection from accidental cuts.

Figure 6A:
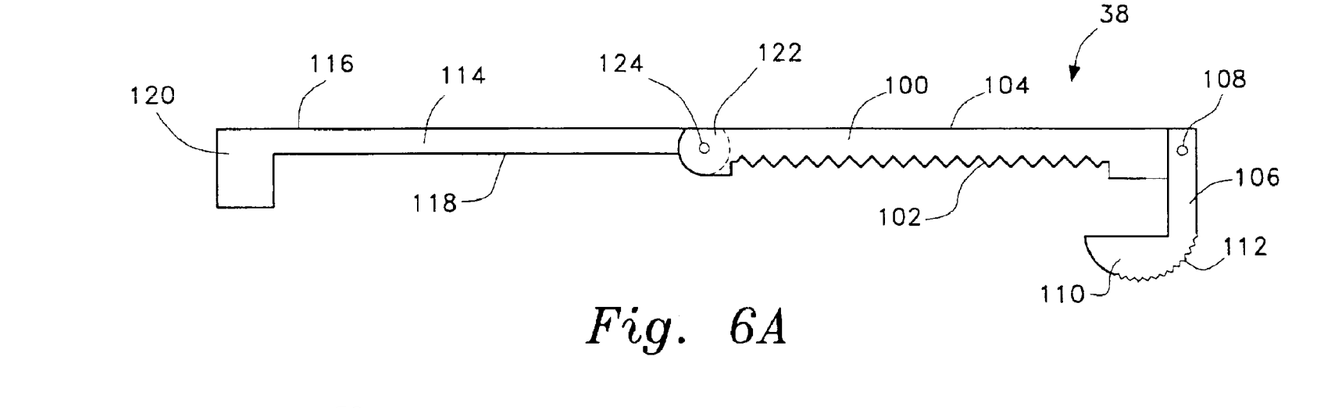
FIG. 6A is a plan view of the pouch clip of FIG. 3A.
Figure 6B:
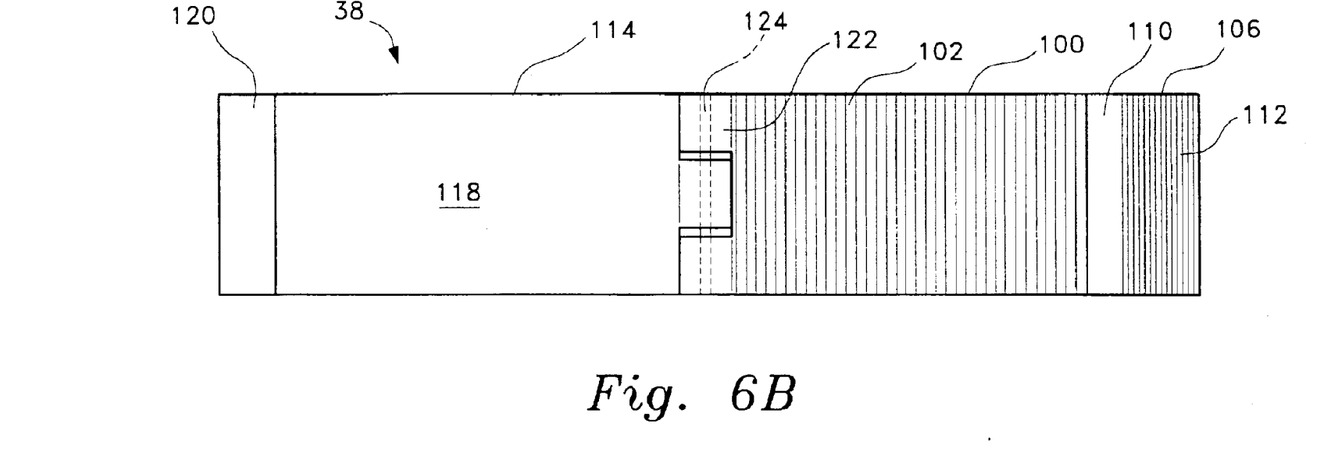
FIG. 6B is an inner side elevation view of the pouch clip of FIG. 6A in the open position.
Figure 6C:
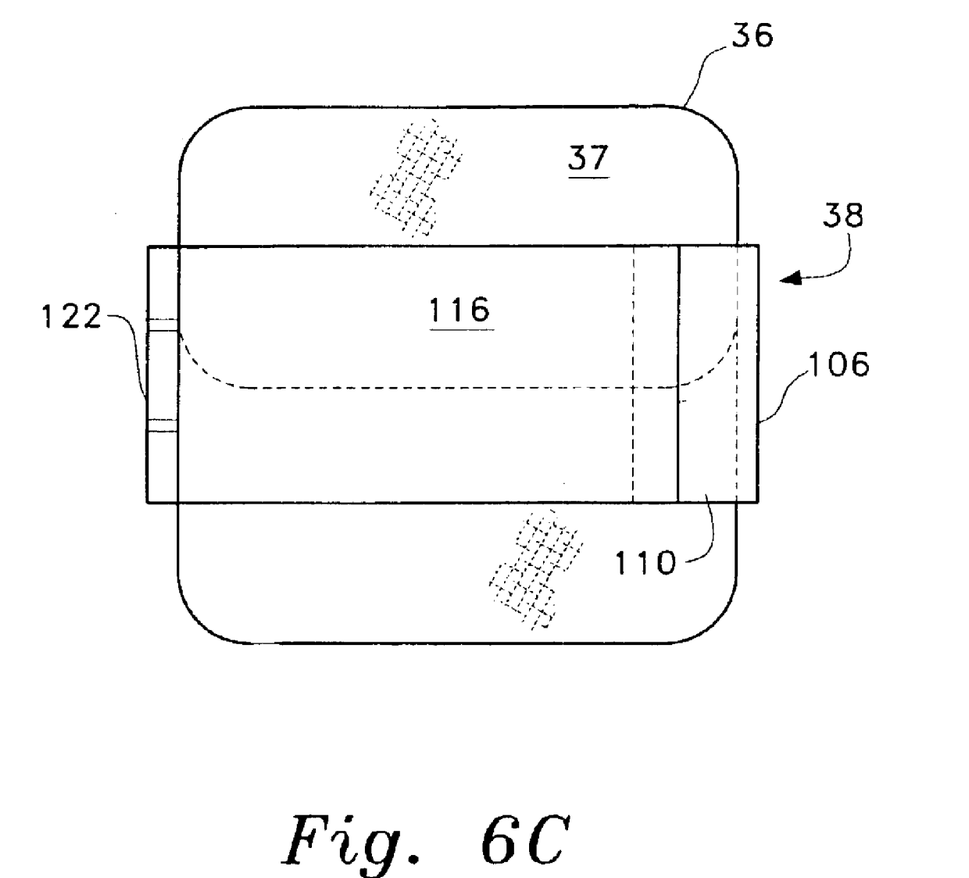
FIG. 6C is a rear elevation view of a flapped pouch having the pouch clip of FIG. 3A mounted thereon in a closed position.

Referring to FIGS. 6A–6C, there are shown a plan view and an inner elevation view of the pouch clip 38 in an open position, and a rear view of a pouch 36 with clip 38 mounted thereon in a closed position. Pouch clip 38 is generally rectangular in shape has a toothed mount portion 100 having a belt engaging grooved side 102 and a mounted side 104 for horizontal mounting on the back 27 of pouch 36. Mount portion 100 has a spring snap 106 at one end thereof attached by a spring snap axel 108. Spring snap 106 extends outward from mount portion 100, ending in an inward turned clip cover engaging portion 110 having grooved thumb grip 112 formed in a portion of its perimeter. Pouch clip 38 also has a rectangular clip cover portion 114 having an outer surface 116 and an inner surface 118 and has a snap engaging end 120 extending outward beyond inner surface 118 of such dimensions as to fit within spring snap 106.

Mount portion 100 and clip cover 114 are attached lengthwise by clip hinge 122 formed by upper and lower end portions of mount portion 100 and center end a center end portion of clip cover 114 and clip cover 114 rotates around hinge pin 124 so as to close over a shoulder strap 18 or 20 for mounting a pouch 36 thereon (see FIGS. 2A and 5A). Clip cover snap engaging end 120 may be inserted into spring snap 106 by rotating the snap outward around axel 108, conveniently by engaging grooved thumb grip 112 with the users thumb and exerting pressure on spring snap 106. The engaging end 120 is then the inner surface of mount portion 100 and the spring snap 106 is allowed to close over clip cover snap engaging end 120, thus securing pouch clip 38 over the shoulder belt. The spring snap 106 has a spring (not shown) that rotates it around axle 108 in a known manner. Clip cover 114 is of such a length relative to mount portion 100 that engaging end 120 is securely held by spring snap 106 when in a closed position. Clip cover 114 is of such a thickness as to provide clearance for the shoulder belt while providing clamping pressure to avoid slippage along the shoulder strap when in a closed position. The grooved portion of toothed mount portion 100 is preferably of the same width as the shoulder strap to be received thereby, and mount portion 100 is preferably of an adequate length to extend horizontally substantially across the back wall 37 of pouch 36.

Figure 7:
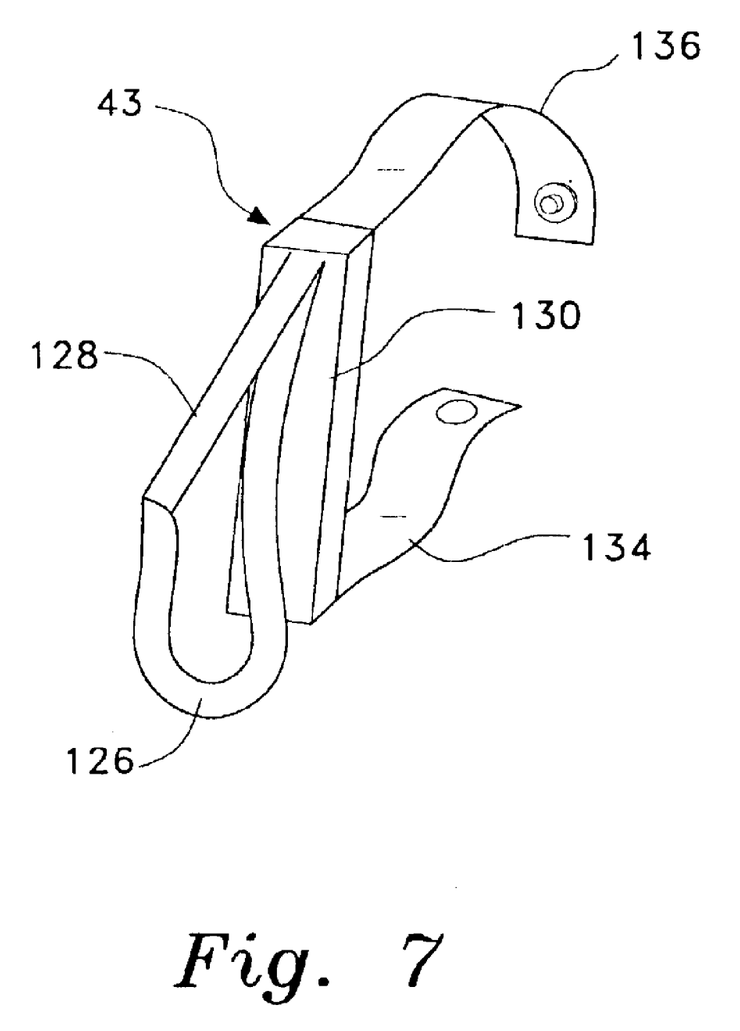
FIG. 7 is a perspective view of the snap hook attachment of FIG. 2.

Referring to FIG. 7, there is shown a perspective view of the snap hook of the invention. Snap hook 43 has a vertical hook 126 and a snap 128 extending outward from a rectangular vertical base 130 and meeting so as to securely receive a fish net or stringer. Upper snap strap 136 extends back from the upper end of base 130 and lower snap strap 134 extends back from the lower end of base 130. Snap hook 43 is removably mounted on waist belt 14 by looping over and under, respectively and snapping together.

The belt, straps, chest strap, and pouches may be made of any appropriate material including leather or cotton, but are preferably of a weather-resistant polymeric woven cloth material conventionally employed in the construction of outdoor sports equipment.

It is to be understood that the present invention is not limited to the sole embodiment described above, but encompasses any and all embodiments within the scope of the following claims.

We claim:

1. A fishing gear holder vest, comprising:

a waist belt having front and rear portions and left and right portions, a belt buckle dividing said front portion;

said waist belt being adjustable in length at said buckle;

at least one shoulder strap adjustably attached to said waist belt for adjusting the height of said waist belt as worn by an angler;

at least one flap pouch removably attached to said at least one shoulder strap;

a flap pouch clip for removably attaching said at least on flap pouch;

wherein said at least one flap pouch has a back wall, said flap pouch clip is horizontally mounted thereon, and said flap pouch is removably attached to said at least one shoulder strap by said flap pouch clip; and a rod-holding ring adjustably attached to said at least one shoulder strap;

whereby an angler wearing said vest may enter water up to his chest while fishing without damaging the contents of said at least one flap pouch;

whereby said angler having entered water up to his chest, has access to said at least one flap pouch;

whereby said angler wearing said vest may insert a fishing rod within said rod holding ring for temporary holding while said angler is in water up to his chest; and whereby when said angler temporarily stores said fishing rod, he may employ both hands to carry out tasks such as rigging tackle.

2. The vest of claim 1 further comprising a rod holding ring strap mounting for said rod holding ring, said strap mounting being adjustably mounted on said at least one shoulder strap for positioning therealong.

3. The vest of claim 1, wherein said clip is rectangular in shape and has a toothed mount portion having a mounted side mounted to said back wall and a grooved belt engaging side and having a spring snap at one end thereof, said clip having a clip cover attached to an opposite end of said mount portion by a hinge, said clip cover having a spring snap engaging portion at an end opposite said hinge, whereby upon mounting said flapped pouch to a shoulder strap, said clip cover is rotated around said hinge and said mount portion engaged by said spring snap thereby clamping said shoulder strap against said grooved belt engaging side of said toothed mount portion, thus removably securing said pouch to said shoulder strap.

4. The vest of claim 1, wherein said at least one shoulder strap includes left and right shoulder straps attached to said waist belt at said respective front and rear portions, said shoulder straps being spaced and attached proximate said left and right portions of said waist belt and bridging said buckle at said front belt portion so as to suspend left and right sides of said waist belt from the respective left and right shoulders of said angler.

5. The vest of claim 4, wherein said left and right shoulder straps each have front, rear, and shoulder portions, and said front portions are attached to said waist belt so as to reach substantially vertically to said respective shoulder portions when worn by said angler.

6. The vest of claim 5, further including a snap hook removably attached to said front portion of said waist belt.

7. The vest of claim 5, further including a line cutter removably attached to said front portion of said waist belt.

8. The vest of claim 5, further comprising a line cutter and a snap hook, each of said line cutter and said snap hook having a back portion having an upper snap strap and a lower snap strap looped over and under said waist belt, respectively, at desired locations and snapped together to removably mount said line cutter and said snap hook to said waist belt.

9. The vest of claim 5, further including a side pouch removably attached to at least one of said left and right waist belt portions, said side pouch having a cover and a bottom wall, said bottom wall defining drains for draining water therefrom after submersion by said angler.

10. The vest of claim 9, wherein said side pouch has a pair of upper snap straps and a pair of lower snap straps extending from said back, said upper snap straps being looped over and said lower snap straps being looped under one of said left or right waist belt portions, and snapped together to removably mount said side pouch to said waist belt.

11. The vest of claim 5, wherein said chest strap fixed end is attached to one of said left and right buckles and said free end is looped through the other of said buckles so as to fold over said body, said free end being adjustable relative to said strap body so as to adjust the length of said strap body between said buckles, said free end having means for attachment at a desired location along said strap body so as to secure said chest strap in position while worn by said angler.

12. The vest of claim 11, wherein said front portion of said waist belt has left and right shoulder strap adjustment rings anchored thereto, said left and right shoulder straps have free ends, said free ends are looped through said respective left and right adjustment rings so as to fold under said left and right front shoulder loop portions, said free ends being adjustable relative to said front shoulder strap portions so as to adjust the length of said shoulder straps and thereby the height of said waist belt, said free ends having means for attachment at a desired location along said respective left and right straps so as to secure said waist belt in position while worn by said angler.

13. The vest of claim 12, wherein said waist belt has a fixed end attached to said buckle and a free end looped through said buckle so as to fold under itself, said free end being adjustable relative to said belt buckle so as to adjust the effective length of said waist belt, said free end having means for attachment at a desired location along said belt so as to secure said belt in position to fit said angler.

14. The vest of claim 13, wherein said means for attachment of said free ends of said chest strap, said shoulder straps, and said waist belt to their respective chest strap body, shoulder strap front portions, and waist belt, respectively is hook material along said free end and loop material along said chest strap body, said shoulder strap front portions, and said waist belt, respectively.

15. The vest of claim 5, further comprising a chest strap having a fixed end, a body, and a free end and extending between said shoulder strap front left and right shoulder portions and adjustably attached thereto by respective left and right buckles so configured as to adjust vertically along said straps to fit a particular angler.

16. The vest of claim 15, wherein said at least one flap pouch includes a plurality of said flap pouches, each one of said plurality of flap pouches has a respective said flap pouch clip; said plurality of flap pouches are attached to said front portions of said left and right shoulder straps by each said respective flap pouch clip.

17. The vest of claim 16, wherein said at least one flap pouch includes a flap pouch mounted on at least one of said left and right shoulder straps below said chest strap, said flap pouch has a bottom wall, said bottom wall defining drains for draining water therefrom after submersion by said angler for holding articles which may be exposed to water during use of said vest.

18. The vest of claim 16, wherein said at least one flap pouch includes a single flap pouch mounted on at least one of said left and right shoulder straps above said chest strap for holding articles which must remain dry during use of said vest.

19. The vest of claim 18, wherein said plurality of flap pouches include four flapped pouches having bottom walls defining drains, two of which are mounted along said left shoulder strap between said chest strap and said waist belt, and two of which are mounted along said right shoulder strap below said chest strap.

* * * * *